Patented July 20, 1954

2,684,377

UNITED STATES PATENT OFFICE 2,684,377

PROCESS FOR MODIFYING GLYCERIDIC FATS AND OILS

Evald L. Skau, New Orleans, La., assignor to the United States of America as represented by the Secretary of Agriculture No Drawing. Application January 2, 1951, Serial No. 204,059

2 Claims. (Cl. 260—428.5)

(Granted under Title 35, U. S. Code (1952), sec. 266)

The invention herein described may be manufactured and used by or for the Government of the United States of America for governmental purposes throughout the world without the payment to me of any royalty thereon.

This invention relates to the separation of particular groups of glyceryl esters of fatty acids from glyceridic mixtures by dissolving the mixtures in non-viscous liquids in which the glycerides form well defined crystals, inducing crystalliztion, and removing the crystals. Where, in such a process, at the temperature of crystallization of the group of glycerides to be removed, two liquid phases are present in addition to the solid phase, this invention provides a method of avoiding the difficulties inherent in the separation of the crystals from a three phase system.

More particularly, this invention provides a method of modifying in a particular manner certain properties of oxygen-containing non-viscous liquids which, as individual compounds or mixtures of such compounds, dissolve glyceridic mixtures, yield well defined crystals of glycerides and at some temperature form immiscible liquid phases containing glycerides. (This class of compounds or mixtures of compounds is referred to throughout the specification and claims as polar solvents.) This invention provides a method of modifying such polar solvents so that, when they contain crystallizable amounts of glycerides, the temperature at which two liquid phases are formed is lowered more than the temperature at which a particular group of glycerides crystallize is lowered.

The removal of particular groups of glyceryl esters of fatty acids is of particular importance in the "winterization" of natural vegetable oils for use in the manufacture of foods such as salad oils and mayonnaise but it is also of importance to edible and inedible animal, vegetable, and fish oils and fats. For example, O. M. Behr in a paper in Ind. & Eng. Chem., vol. 28, 299–301 (March 1936) states that the same theory applies in the removal of higher melting mixed saturated and unsaturated triglycerides from drying oils such as sardine, linseed, perilla, hempseed and the like oils and that "Theoretically the presence in an oil of saturated acid radicals would hinder the polymerization of the oil. A varnish plant in the East, which uses a recording thermometer during the kettle-bodying of sardine oils, reported that a thoroughly winterized oil with a 12-hour chill test (F. F. acid, 0.25%) polymerized several hours sooner, to the same degree of polymerization as measured by the viscosity, than winterized varnish-grade oil previously used." On the basis of his own experiments he further states that "It may be concluded, therefore, that highly refrigerated oils will polymerize more rapidly under the same heat input than lightly winterized oils. The presence of glycerides, solid at freezing temperatures are detrimental to polymerization. . . .

"The conclusion is that more reaction takes place between phenolic resins and sardine oil than with linseed oil (probably because of the highly unsaturated clupanodonic acid radicals in the sardine oil) and that a maximum of reactivity takes place with thoroughly winterized oils."

In addition, the removal of particular groups of glycerides by crystallization is important in the alteration of the degree of unsaturation (generally expressed as iodine value) of glyceridic mixtures. It is commonly known, for example, that when glyceridic fats and oils as such, or in solution, are partially solidified by chilling, the solid fraction, freed from solvent, has a lower iodine value and contains a larger proportion of normally solid glycerides, and the liquid fraction, freed from solvent, has a higher iodine value and contains a larger proportion of the normally liquid glycerides than the original oil. Thus, it is obvious that this invention is applicable to any process for modifying fats and oils or in any process for separating fats and oils into two or more fractions having different iodine values or, in general, different properties, as long as the process involves crystallization from a polar solvent at temperatures at which the formation of two liquid layers is encountered.

While the process is applicable to the isolation, for any purpose, of substantially any group of crystallizable glycerides from substantially any glyceridic mixture, a preferred embodiment of the process is in the winterization of vegetable oil materials in a crude, refined, randomized or otherwise processed state.

In order to avoid the repetition of minor modifications which would be obvious to those skilled in the art, the details of conducting the process of this invention will be discussed with particular reference to the winterization of cottonseed and peanut oils.

Refined peanut and cottonseed oils are unsatisfactory for use as salad oils because solids or crystals tend to separate or settle out after a short exposure to refrigerator temperatures. This makes the oil turbid or non-homogeneous.

Such an oil is unsuitable for use in salad dressings and, particularly, for use in mayonnaise and dressings of the liquid type, such as French dressing, because of unsatisfactory emulsion stability at ordinary refrigerator temperatures. The tendency of mayonnaise to "break" upon chilling is thought to be caused by the partial crystallization of the oil used.

While cottonseed oil can be winterized (chilled until sufficient glycerides solidify to leave an oil which will not form solids at refrigerator temperatures) it requires slow and careful chilling and since the oil is very viscous at the required temperatures the removal of the crystals is difficult. The winterization of undiluted naturally occurring glyceridic mixtures is tedious and inefficient.

Peanut oil cannot be so winterized at all. The solidified glycerides do not settle and cannot be removed by filtering or centrifuging. This may be due to the nature of the crystals formed or to the viscosity and other characteristics of the oil at the low temperature required, or it may be both. The chilled oil has the appearance and many of the characteristics of a gel, and cannot be filtered satisfactorily. For these reasons it has heretofore been found impracticable to prepare a winterized peanut oil on a commercial basis.

Obviously various attempts have been made to more efficiently remove enough glycerides to provide winterized cottonseed and peanut oils. It is reported that some improvement in the winterization of cottonseed oil is attained by diluting the oil with a hydrocarbon, e. g. hexane. However, it has been found that in hydrocarbon solutions, just as in liquid glyceridic mixtures, the solid glycerides are formed in a more or less amorphous state and their removal is correspondingly difficult. For example, even though peanut oil is diluted with hexane, the glycerides which solidify upon cooling remain suspended throughout substantially the whole volume of liquid giving it a gel-like character and thus cannot be removed by centrifuging and can be filtered off only with great difficulty. In addition a systematic study of such a use of hexane under typical industrial conditions lead to the following conclusions by the staff of the Southern Regional Research Laboratory: "It is indicated that hexane under the conditions of these experiments would not be a practical solvent for use in the industrial winterization of cottonseed oil. Too close a control of both the chilling temperature and the oil-solvent ratio would be necessary in order to regulate the amount of solid separating in a 3-hour chilling period. At a given chilling temperature the initial rate of crystallization is very low up to a certain oil-solvent ratio. An increase in the oil concentration beyond this value results in a sharp increase in the amount of solid separating. Also, beyond this sudden break in the curve a small change in the chilling temperature will cause a large change in the percentage of solid separating. A high degree of supersaturation seems to be necessary before the initial rate of separation is appreciable. Thus, the solid yield is very sensitive to changes in temperature and concentration for a 3-hour chilling period. Gentle agitation does not change the shape of the curve appreciably. A longer chilling period results in more solid separating with a less sharp break in the curve but in a continuous process a chilling period longer than 3 hours is considered impracticable industrially."

In contrast to the hydrocarbons, oxygen-containing liquids which dissolve glyceridic mixtures without reaction have been found to provide a medium in which well defined crystals (compared to those which form in the oils or in hydrocarbons) are formed. In addition, in such oxygen-containing liquids the crystals form more rapidly than any solid phase forms when the solvent is a hydrocarbon. With various purposes in mind the behavior of numerous oxygen-containing liquids as solvents for glyceridic mixtures have been studied. In general such compounds including ketones, aldehydes, esters, alcohols and the like classes of compounds have been found to provide mediums in which good crystals form but have been found to form two immiscible (the term being employed to refer to liquids which are not completely miscible) liquid phases before a substantial amount of glyceride crystals form. Such liquid phases vary greatly in density; one being much denser and containing much more of the dissolved glycerides than the other. In the process of U. S. Patent No. 2,345,576 this property is used to extract antioxidants from fatty materials by dissolving the material in an oxygen-containing liquid, cooling until the immiscible liquid phases form, and removing the lighter phase.

In the case of refined cottonseed and peanut oils we have found that in the ranges of concentration and temperature suitable for winterization, numerous polar solvent-oil mixtures separate into two liquid phases in addition to the solid phase. The presence of these two immiscible liquid layers interferes with the efficiency of the separation of the solid from the liquid. This is particularly true if filtration is employed as the method of separation. Similarly, if centrifugation or settling is used, the solid or crystals entrain some of the heavier liquid layer which contains a higher concentration of oil than is contained in the original oil-solvent mixture resulting in a loss in yield of winterized oil.

I have surprisingly discovered that mixing a minor portion of a normally liquid hydrocarbon boiling below about 120° C. with a polar solvent modifies the solvent properties so that the temperature at which a given fraction of glycerides would crystallize in the polar solvent is lowered only slightly whereas the temperature at which the polar solvent would form two liquid phases (above or below the temperature at which a solid phase was present) is greatly lowered. In addition; the glyceride crystals form rapidly, as they do in polar solvents alone; and have a well defined shape, as they do in polar solvents alone. The application of this entirely unpredictable phenomenon to the crystallization of a group of glycerides which in a polar solvent crystallize at a temperature at which two liquid phases are present in addition to the solid phase provides a remarkably easy and effective way of overcoming the difficulties inherent in separating a a solid from a three phase system containing a heavy oily liquid phase.

In the case of peanut oil, the application of this discovery provides, for the first time, a commercially feasible process for the production of a winterized oil.

The proportion of hydrocarbon solvent required varies with the nature and purity of the polar solvent, with the type of fat or oil (or, in general, glyceridic mixture) and sometimes with different specimens of the same type of fat or oil, and depends upon the oil-solvent ratio to be used, upon the amount of solid it is desired to remove from the oil, and therefore upon the chilling temperature to be used. In general, when larger percentages of solid are to be removed from an oil and also when lower chilling temperatures are used, the proportion of hydrocarbon solvent required to prevent the formation of two liquid layers must be increased.

With peanut or cottonseed oil, when acetone is used as the polar solvent, the largest proportion of hydrocarbon solvent is required when the oil-solvent ratio is in the neighborhood of 35 parts by weight of oil and 65 parts by weight of mixed solvent. When higher or lower oil-solvent ratios are used, smaller proportions of hydrocarbon solvent will usually suffice.

The minimum amount of hexane which must be present in an acetone-hexane mixture in order that no separation into two liquid layers will occur at the chilling temperature required for adequate winterization at any oil-solvent ratio is in the case of peanut oils usually somewhere between one and twenty parts by weight. For example, in the case of the peanut oils tested a solvent mixture consisting of 15 parts by weight of hexane and 85 parts by weight of industrial C. P. acetone has been found to give satisfactory results in this respect at all oil-solvent ratios up to 75 weight percent of oil.

The actual proportion of hexane used over and above that necessary to prevent the formation of two liquid layers would depend upon a compromise between the advantages and the disadvantages involved in increasing this proportion. For example, very much higher proportions of hexane may be used but correspondingly lower chilling temperatures will be required for the separation of the desired amount of solid from the mixture. Likewise very much lower proportions of hexane will suffice if the oil-solvent ratios to be used are such that separation into two liquid layers will not occur at the chilling temperature required to cause the desired amount of solid to separate.

In the case of the winterization of cottonseed oil with acetone the separation into two liquid layers in addition to the solid phase ordinarily takes place below the temperature necessary to cause separation of sufficient solid to produce an adequately winterized oil. The addition of a hydrocarbon solvent such as hexane to the acetone used as solvent may not always be absolutely necessary in the case of such oils. However, I have found that impurities such as moisture and other undetermined constituents in the oil, or in the acetone, will cause the separation into two liquid phases in addition to the solid phase to take place at considerably higher temperatures, that is, high enough to interfere with the winterization process. In such cases the acetone plus water and/or other constituents becomes a polar solvent consisting of two or more compounds. The addition of a hydrocarbon solvent such as hexane to the acetone in such a solvent winterization is therefore distinctly advantageous, since it serves as a safety measure against possible formation of two liquid layers due to inadvertent variations in the constitution of the oil or in the purity of the acetone used as winterizing solvent. The value of the application of the process of this invention where fractions of glycerides having lower crystallization temperatures are to be removed from such an oil is obvious, as is the attainment of the above advantage in the case of removing other fractions of glycerides from other oils in other polar solvents behaving as cottonseed oil does in acetone.

The details of the application of the process of the present invention to various glyceridic mixtures dissolved in various typical solvents are illustrated by the following examples.

In the examples the term "parts" refers to parts by weight and percent refers to the percent by weight.

The procedure followed in each of the examples was as follows:

Samples of approximately 200 ml. of the desired concentrations of oil in solvent were weighed into tared 250 ml. stoppered glass centrifuge bottles. The samples were chilled at the desired temperature for a definite period (hereinafter referred to as holding-time) by immersion in a constant temperature bath regulated to within ±0.1° C. They were then quickly transferred to a refrigerated centrifuge and centrifuged at the same temperature for at least 10 minutes (usually for 30 minutes) at a speed corresponding to about 350 and 700 times gravity at the top and bottom of the solutions, respectively. The temperature of the centrifuge was so regulated that the liquid in the bottles during centrifugation was within 0.5° C. of the desired temperature. Unless so indicated, in no case were there two liquid phases present.

As much of the clear supernatant liquid was decanted into a tared flask as was possible without including any suspended solid particles. The centrifuge bottle with the residual solid and liquid (hereinafter referred to as the solid fraction) was weighed and the weights of the decanted supernatant liquid and of the solid fraction obtained by difference.

The amount and concentration of the oil in both the decanted supernatant liquid and the solid fraction were determined quantitatively by removing the solvent and heating to constant weight at 100° C. and 10 mm. pressure under a stream of nitrogen. Using these data calculations were made to determine the percentage of the oil which had separated as solid under the conditions of the experiment, based on the amount of oil originally present in each sample. This percentage value is hereinafter referred to as the "percent solid removed."

As a criterion of the degree of winterization, a modification of the American Oil Chemists' Society Official Method Cc 11–42 Cold Test was used which was suitable for testing the small samples encountered and which was shown by comparative tests to give essentially the same cold test values as the official method. The end-point or point of failure was taken as the time at which a slight, almost indiscernible haze formed which was best detected by the loss of brilliance when compared with a clear control sample against a fluorescent light as a background. The term "cold test" as used in the examples refers to the cold test value obtained in this manner upon the oil recovered from the supernatant liquid.

EXAMPLES 1 TO 27

*Various oil-solvent ratios, hydrocarbon-polar solvent ratios, temperatures, holding-times, and glyceridic mixtures*

The oils used were vegetable oils separated from the source materials and refined in the conventional manner. A and C were bleached peanut oils, B was a peanut oil, and D was a bleached cottonseed oil. The polar solvent was a commercial C. P. acetone and the hydrocarbon was a commercial hexane, Skellysolve B.

| Example No. | Oil | Solvent Composition in Parts by Weight | | Percent Oil in Solvent Solution | Chilling Temp., °C. | Holding-Time (Hours) | Percent Solid Removed | Cold Test (Hours) |
|---|---|---|---|---|---|---|---|---|
| | | Polar Solvent | Hydrocarbon | | | | | |
| 1 | A | 84 | 16 | 10 | −10 | 3 | 4.3 | 1¼ |
| 2 | A | 84 | 16 | 35 | −10 | 3 | 5.4 | 8½ |
| 3 | A | 85 | 15 | 35 | −12.5 | 3 | 7.3 | >72 |
| 4 | B | 85 | 15 | 20 | −10 | 3 | 4.2 | >72 |
| 5 | B | 85 | 15 | 40 | −10 | 3 | 4.6 | >72 |
| 6 | B | 85 | 15 | 40 | −10 | 24 | 4.7 | >72 |
| 7 | B | 85 | 15 | 60 | −10 | 3 | 4.8 | >72 |
| 8 | B | 85 | 15 | 20 | −8 | 3 | 3.6 | 15 |
| 9 | B | 85 | 15 | 40 | −8 | 3 | 4.2 | >72 |
| 10 | B | 85 | 15 | 60 | −8 | 3 | 4.5 | >72 |
| 11 | B | 85 | 15 | 20 | −6.5 | 3 | 2.6 | 2.5 |
| 12 | B | 85 | 15 | 40 | −6.5 | 3 | 3.9 | >6 |
| 13 | B | 85 | 15 | 20 | −12 | 3 | 4.8 | >72 |
| 14 | B | 85 | 15 | 40 | −12 | 3 | 5.1 | >72 |
| 15 | B | 85 | 15 | 60 | −12 | 3 | 5.3 | >72 |
| 16 | C | 85 | 15 | 10 | −10 | 3 | 2.5 | 42 |
| 17 | C | 85 | 15 | 25.5 | −10 | 3 | 3.9 | >84 |
| 18 | C | 85 | 15 | 40 | −10 | 3 | 4.1 | >84 |
| 19 | C | 85 | 15 | 55 | −10 | 3 | 4.3 | >84 |
| 20 | D | 85 | 15 | 20 | −12 | 3 | 4.8 | 3 |
| 21 | D | 85 | 15 | 40.5 | −12 | 3 | 10.5 | >97 |
| 22 | D | 85 | 15 | 60 | −12 | 3 | 12.9 | >97 |
| 23 | D | 85 | 15 | 75 | −12 | 3 | 14.5 | >97 |
| 24 | D | 85 | 15 | 20 | −10 | 3 | 0.9 | 1.5 |
| 25 | D | 85 | 15 | 40 | −10 | 3 | 8.3 | 24-39 |
| 26 | D | 85 | 15 | 60 | −10 | 3 | 11.6 | >162 |
| 27 | D | 85 | 15 | 75 | −10 | 3 | 13.2 | >162 |

EXAMPLES 28 TO 30

*Hydrocarbons other than hexane*

The oil used was a peanut oil which had been extracted and refined in the conventional manner (oil B above). The polar solvent was commercial C. P. acetone and the hydrocarbons were (a) commercial pentane, Skellysolve F, (b) isooctane, a pure grade consisting of not less than 99 mole percent 2,2,4-trimethylpentane, and (c) cyclohexane, Eastman Kodak Co. M. P. 3-5° C.

| Example No. | Solvent Composition in Parts by Weight | | Percent Oil in Solvent Solution | Chilling Temp., °C. | Holding-Time (Hours) | Percent Solid Removed | Cold Test (Hours) |
|---|---|---|---|---|---|---|---|
| | Polar Solvent | Hydrocarbon | | | | | |
| 28 | 87 | (a) 13 | 30 | −10 | 3 | 5.1 | >160 |
| 29 | 80 | (b) 20 | 32 | −10 | 3 | 4.4 | >160 |
| 30 | 80 | (c) 20 | 30 | −12 | 3 | 5.0 | >183 |

EXAMPLE 31

*Raising the iodine value of a glyceridic mixture containing unsaturated glycerides*

A peanut oil which had been separated from the source material and refined in the conventional manner having an iodine value of 93.4 was dissolved to form a 20% solution in a mixture of 85 parts of commercial C. P. acetone and 15 parts of commercial hexane, Skellysolve B. It was subjected to a chilling temperature of −12° C. for a holding-time of 3 hours. The oil recovered from the supernatant liquid had an iodine value of 95.8. The oil recovered from the solid fraction had an iodine value of 89.2. The calculated iodine value of the solid removed was approximately 50.

A commercial crude cottonseed oil having an iodine value of 100.2 was dissolved to form a 35.2% solution in a mixture containing 85 parts by weight of commercial C. P. acetone and 15 parts by weight of commercial hexane, Skellysolve B. It was subjected to a chilling temperature of −14° C. for a holding-time of 24 hours. The total solid removed was 16.9%. The oil recovered from the supernatant liquid and then refined had an iodine value of 110.2.

EXAMPLES 32 TO 34

*Removing glyceride fractions from impure glyceridic mixtures*

The oils used were crude oils extracted from the source materials in the conventional manner. Oils A and B were crude peanut oils and oil C was a crude cottonseed oil. The cold tests were made after the oils had been refined in the conventional manner. The polar solvent was a commercial C. P. acetone and the hydrocarbon was a commercial hexane, Skellysolve B.

| Example No. | Oil | Solvent Composition in Parts by Weight | | Percent Oil in Solvent Solution | Chilling Temp., °C. | Holding-Time (Hours) | Percent Solid Removed | Cold Test (Hours) |
|---|---|---|---|---|---|---|---|---|
| | | Polar Solvent | Hydrocarbon | | | | | |
| 32 | A | 85 | 15 | 35 | −12.5 | 3 | 6.1 | 3 |
| 33 | B | 85 | 15 | 35 | −12 | 24 | 4.7 | >90 |
| 34 | C | 85 | 15 | 35 | −14 | 24 | 17.6 | >48 |

EXAMPLE 35

*Removing glycerides from interesterified glyceridic mixtures*

A refined peanut oil was interesterified by heating in the presence of 0.1% of sodium methylate for 0.5 hours at 50° C., destroying the catalyst with dilute phosphoric acid, washing, and stripping and drying under 10 mm. pressure at 120° C.

A 40% solution of the oil in a mixture of 85 parts of acetone and 15 parts of hexane was subjected to a chilling temperature of −13° C. and a holding-time of 20 hours.

The percent solid removed was 6% and the treated oil was found to have a cold test of 2 hours.

EXAMPLE 36

*Mixed polar solvents*

A 40% solution of refined cottonseed oil in a mixture of 99 parts of C. P. acetone and 1 part of water was cooled to a temperature of 5° C. Two immiscible liquid phases were formed in addition to the solid phase and after a holding-time of 3 hours the total weight of solid separating was less than 0.5% of the total weight of oil treated (equivalent to a cold test of less than ½ hour).

A 40% solution of the same oil in a mixture of 85 parts of a C. P. acetone solution containing 1% water and 15 parts of commercial hexane was cooled to −8° C. In addition to the solid phase, only one liquid phase was present. After a 3-hour holding-time 5.1% of solid separated and the oil had a cold test of 7.5 hours.

Many modifications may, of course, be made in utilizing this invention and it is not intended to limit it to the particular details mentioned in the illustrations. For example, choice of chilling temperature, holding-time, oil-solvent ratio, the method of separation of the solid from the liquid, a continuous or a batch process, and the proportion of non-polar to polar solvent depends upon the oils treated and the results desired.

Having thus described my invention, I claim:

1. A process comprising interesterifying peanut oil by heating in the presence of sodium methylate catalyst, destroying the catalyst with phosphoric acid, and adding acetone and hexane in the ratio of 85 to 15 parts by weight, respectively to form a forty percent solution of the oil in the acetone and hexane, and chilling to about −13° C., and removing the solids formed.

2. A process of fractionating a peanut oil into a winterized oil having an iodine number greater than the iodine number of the peanut oil and a mixture of glycerides having an iodine number of less than the iodine number of the peanut oil, comprising: mixing enough acetone and hexane with the oil to form a mixture which at normal room temperature is a homogeneous solution containing from about 10 to 75 parts of oil per 100 parts of a solvent consisting of acetone and hexane in a ratio of about 85 parts to 15 parts respectively; cooling the mixture so formed to a temperature below minus 6.5° C. but above the temperature at which two liquid phases form; centrifuging the cold mixture and isolating a solution fraction containing only dissolved glycerides, said glycerides having an iodine number greater than the original peanut oil, and a slurry fraction containing solidified glycerides and an amount of dissolved glycerides which, mixed with the solidified glycerides, forms a mixture of glycerides having an iodine number lower than the iodine number of the original peanut oil.

References Cited in the file of this patent

UNITED STATES PATENTS

| Number | Name | Date |
| --- | --- | --- |
| 2,228,040 | Voogt et al. | Jan. 7, 1941 |
| 2,505,012 | Spannuth | Apr. 25, 1950 |